United States Patent [19]

Hait

[11] Patent Number: 4,896,650

[45] Date of Patent: *Jan. 30, 1990

[54] COOKING UNIT WITH IMPROVED FIRE GRATE

[75] Inventor: Paul W. Hait, Los Gatos, Calif.

[73] Assignee: Pyromid, Inc., Redmond, Oreg.

[*] Notice: The portion of the term of this patent subsequent to May 23, 2006, has been disclaimed.

[21] Appl. No.: 294,367

[22] Filed: Jan. 9, 1989

Related U.S. Application Data

[63] Continuation of Ser. No. 143,618, Nov. 13, 1988, Pat. No. 4,829,975.

[51] Int. Cl.[4] ............................................. F24C 1/16
[52] U.S. Cl. ............................... 126/9 R; 126/9 B; 126/152 B; 126/163 R
[58] Field of Search ............. 126/25 R, 152 R, 152 B, 126/152 A, 163 R, 9 R, 30, 9 B, 29; 99/340, 449, 446, 447; 44/34, 38, 40

[56] References Cited

U.S. PATENT DOCUMENTS

| | | | |
|---|---|---|---|
| 3,245,398 | 4/1966 | Baker | 126/152 |
| 3,279,453 | 10/1966 | Norehad | 126/25 |
| 3,353,527 | 11/1967 | Anderson | 126/25 |
| 3,838,679 | 10/1974 | Welch | 126/165 |
| 4,305,375 | 12/1981 | George | 126/164 |
| 4,508,094 | 4/1985 | Hait | 126/9 R |
| 4,531,505 | 7/1985 | Hait | 126/9 R |
| 4,535,748 | 8/1985 | Hunerwadel | 126/25 R |

FOREIGN PATENT DOCUMENTS

| | | | |
|---|---|---|---|
| 355055 | 6/1922 | Fed. Rep. of Germany | 126/152 B |
| 2439805 | 3/1976 | Fed. Rep. of Germany | 126/9 B |
| 22672 | 8/1921 | France | 126/540 |

OTHER PUBLICATIONS

Advertising Literature entitled America's Portable Grill Stove Copyrighted 1987 by Pyromid, Inc.

Primary Examiner—James C. Yeung
Attorney, Agent, or Firm—Jack M. Wiseman

[57] ABSTRACT

A fire grate is formed with a slot configured to receive a narrow dimensioned section of a briquette. The walls surrounding the slot support the briquette in vertical orientation with the narrow dimensioned section of the briquette extending upwardly. Combustion air or gas flows through the slot for exposing the briquette to the combustion air or gas.

6 Claims, 5 Drawing Sheets

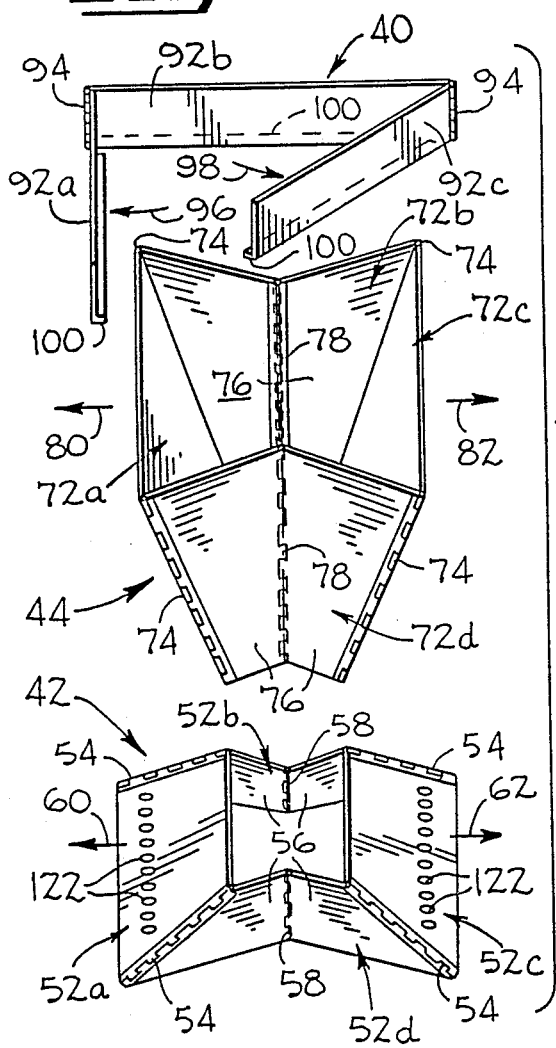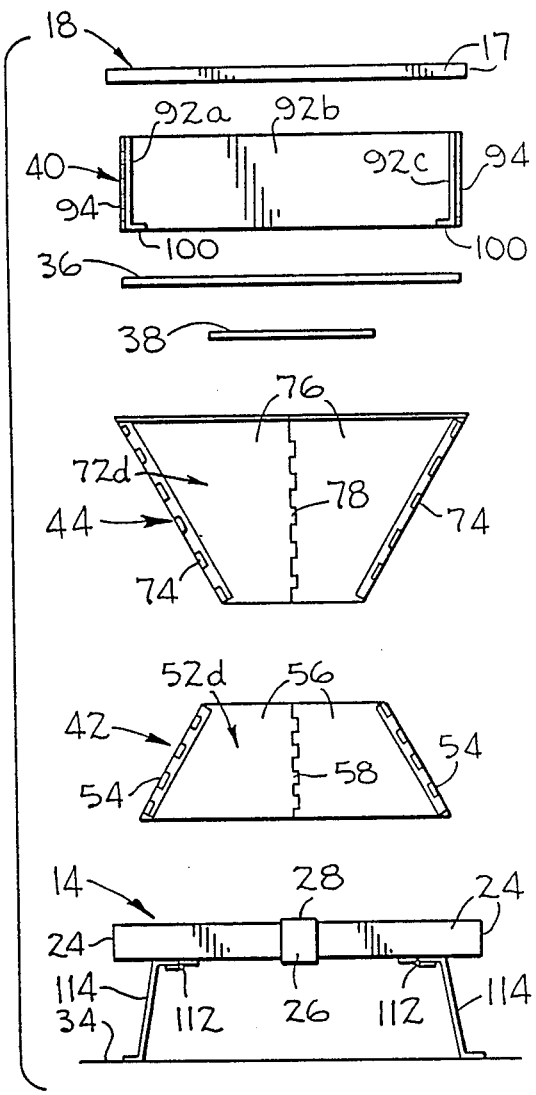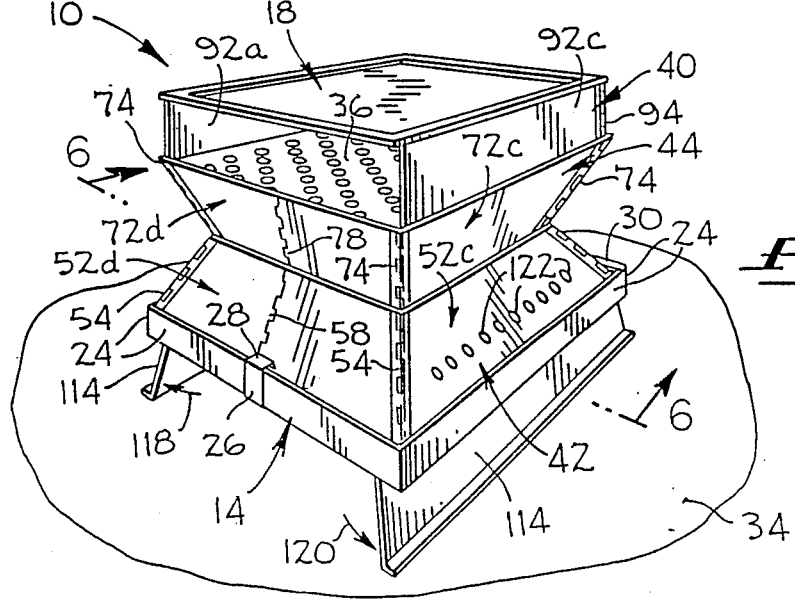

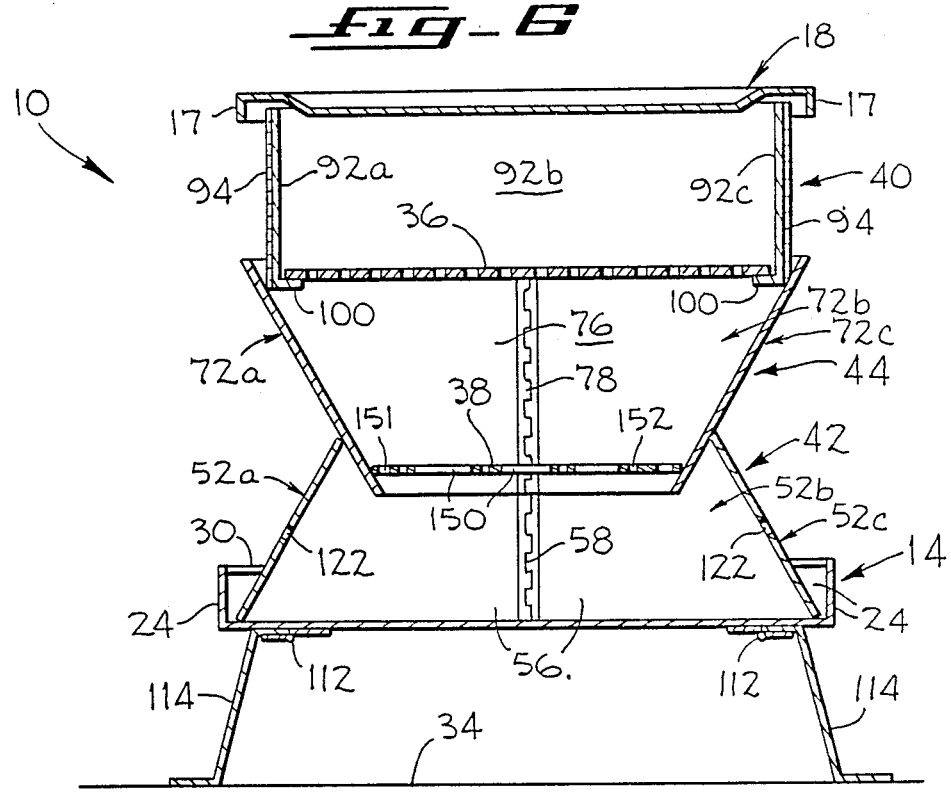
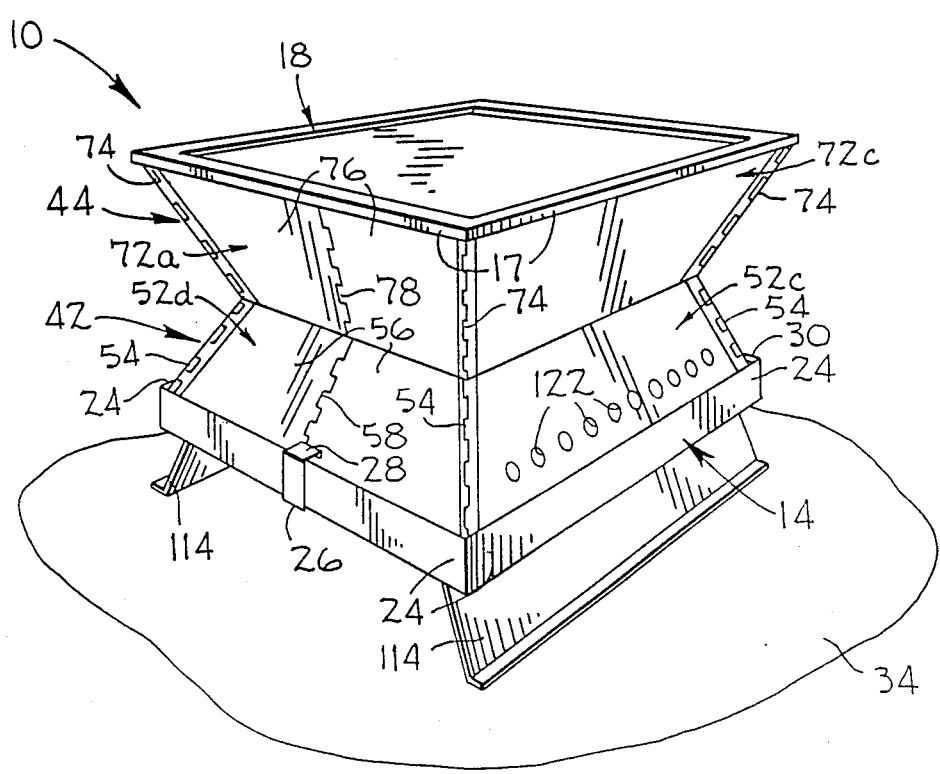

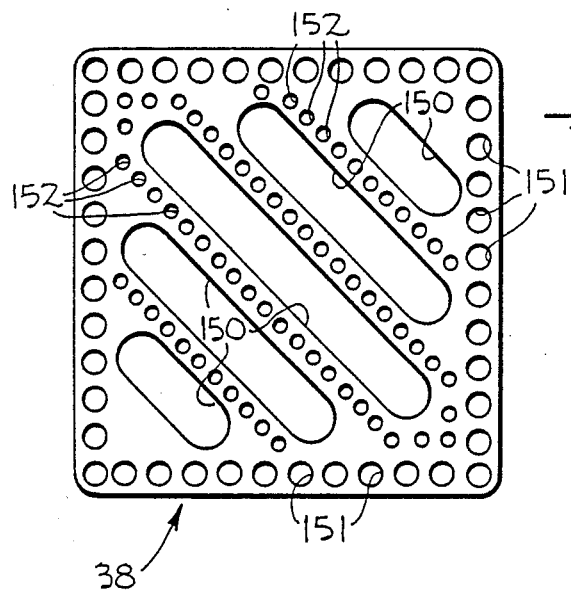
fig_8
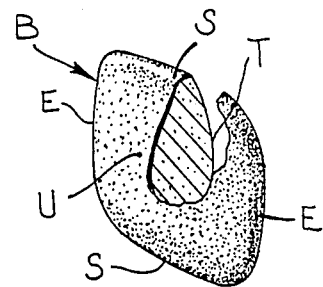
fig_9A
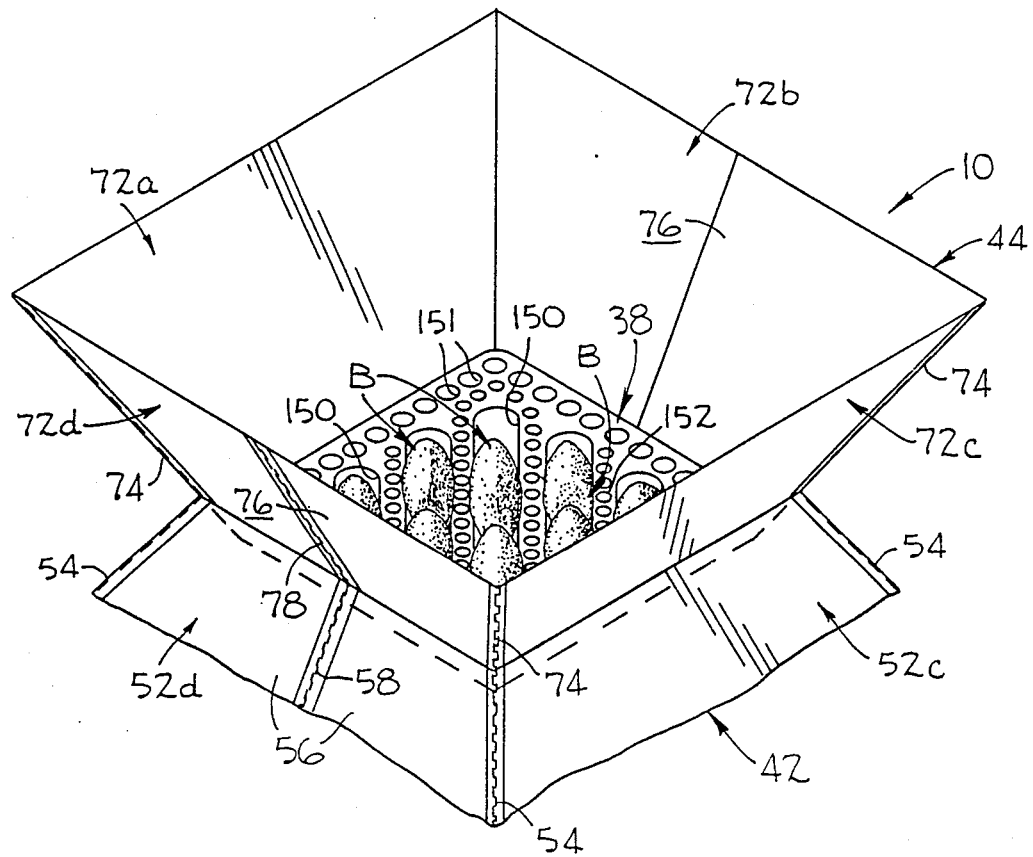
fig_9

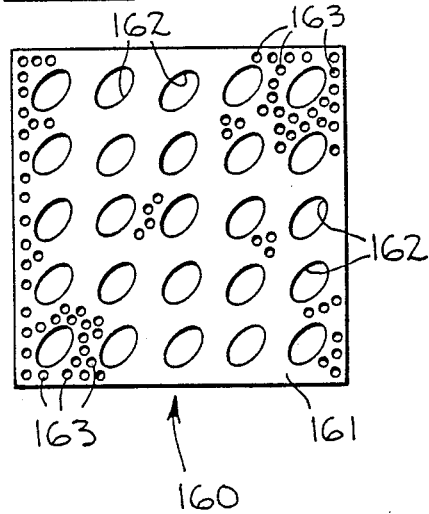
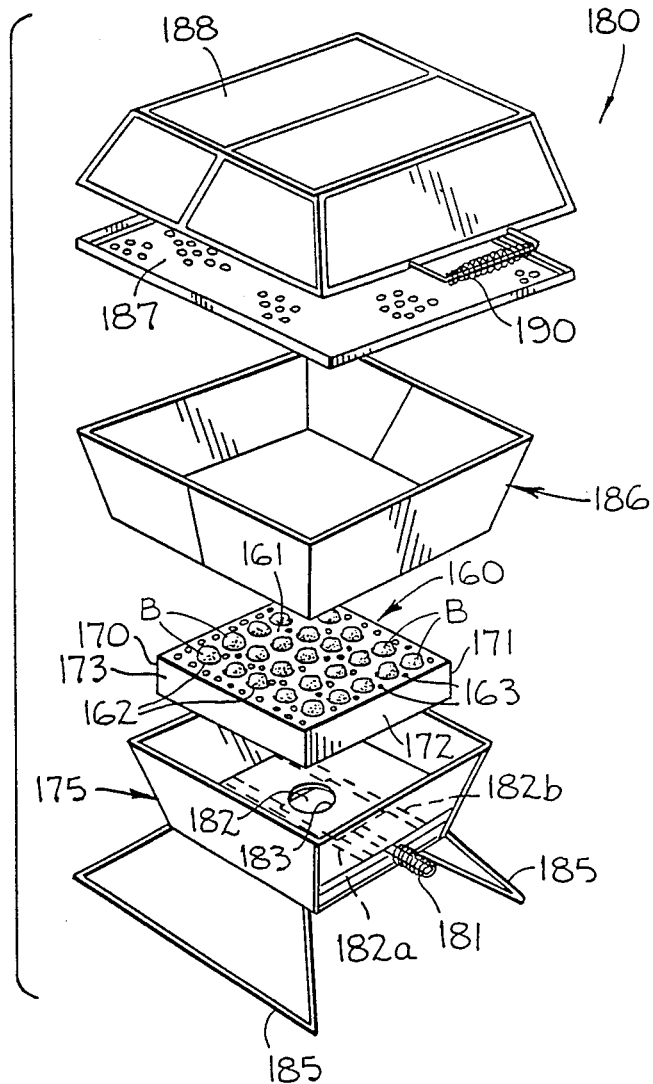
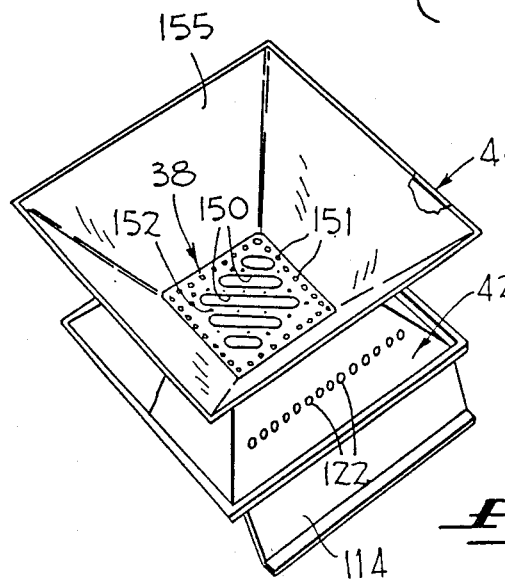

COOKING UNIT WITH IMPROVED FIRE GRATE

RELATED APPLICATION

This application is a continuing application of my pending application, Ser. No. 07/143,618, filed on Jan. 13, 1988, U.S. Pat. No. 4,829,975 for Cooking Unit With Improved Fire Grate.

BACKGROUND OF THE INVENTION

The present invention relates in general to outdoor cooking units, and more particularly to an outdoor cooking unit with an improved fire grate.

Heretofore, outdoor cooking units included fire grates on which briquettes were disposed. Such fire grates were formed with parallel rods or cylindrical aligned slots over which briquettes were disposed. The fire grates heretofore used in the outdoor cooking units accommodated the generally flat bottom of the briquettes. Generally, the briquettes were placed on the fire grates in a random fashion. As a consequence thereof, the heat generated by such briquettes never reached the optimum temperature expeditiously.

Cooking units made of stainless steel have been disclosed in U.S. Pat. No. 4,508,094, issued to Paul W. Hait on Apr. 2, 1985, for Convertible Cooking Unit and in U.S. Pat. No. 4,531,505, issued to Paul W. Hait et al. on July 30, 1985, for Convertible Cooking Unit With An Oven. The stainless steel walls reflect the heat generated by briquettes for improved fuel efficiency.

SUMMARY OF THE INVENTION

A fire grate for a cooking unit that receives a narrow edge of a fuel element to support the fuel element for extending upwardly. The fuel element is exposed to combustion air or gas.

A fire grate for a cooking unit to receive a narrow edge of fuel elements to support the fuel elements for vertical orientation. The fuel elements are disposed in spaced relation for combustion air or gas to flow therebetween.

A feature of the present invention is that the heat generated by spaced fuel elements supported at the narrow dimension thereof in vertical orientation reach optimum temperature more expeditiously.

Another feature of the present invention is that fuel elements seated on a fire grate either at the narrow dimension thereof as distinguished from the flat bottom or flat top thereof have greater propensity for the ashes to fall off the fuel elements, thus enabling the fuel elements to heat to higher temperatures and enabling greater exposure to combustion air or gas for producing hotter fuel elements more expeditiously.

BRIEF DESCRIPTION OF THE DRAWINGS

FIG. 3 is a diagrammatic, exploded, perspective view of the support member, firebox, and windbreak illustrated in FIG. 2 showing the unfolding of the support member, the firebox, and the windbreak for assembling and erecting the cooking unit embodying the present invention.

FIG. 4 is a diagrammatic, exploded elevation view of the cooking unit shown in FIG. 1 in an erected state and illustrating the support, the extended support member, the extended firebox, the fire grate, the cooking grill, the extended windbreak and the cover.

FIG. 5 is a diagrammatic, perspective view of the cooking unit shown in FIG. 1 assembled and in an erected state for the cooking of food.

FIG. 6 is a diagrammatic, vertical sectional view of the cooking unit shown in FIG. 5 taken along the line 6—6 of FIG. 5.

FIG. 7 is a diagrammatic, perspective view of the cooking unit shown in FIG. 5 with the windbreak removed and the cover resting upon the upper edges of the firebox.

FIG. 8 is a plan view of a fire grate embodying the present invention.

FIG. 9 is a perspective view of a firebox employed in the cooking unit shown in FIGS. 1-7 and particularly illustrating the fire grate shown in FIG. 8 with briquettes supported thereon according to the present invention.

FIG. 9A is a perspective view of a briquette employed in connection with the fire grate of the present invention with a portion thereof broken away.

FIG. 10 is a plan view of a modification of the fire grate shown in FIG. 8.

FIG. 11 is a diagrammatic, exploded perspective view of a cooking unit which is a modification of the cooking unit shown in FIGS. 1-7 and particularly illustrating the fire grate shown in FIG. 10 and an air flow regulator.

FIG. 12 is a fragmentary, diagrammatic perspective view of the cooking unit shown in FIGS. 1-7 and particularly illustrating a foil liner bag disposed in the firebox below the fire grate embodying the present invention.

DETAILED DESCRIPTION OF THE PREFERRED EMBODIMENTS

Figure 1:
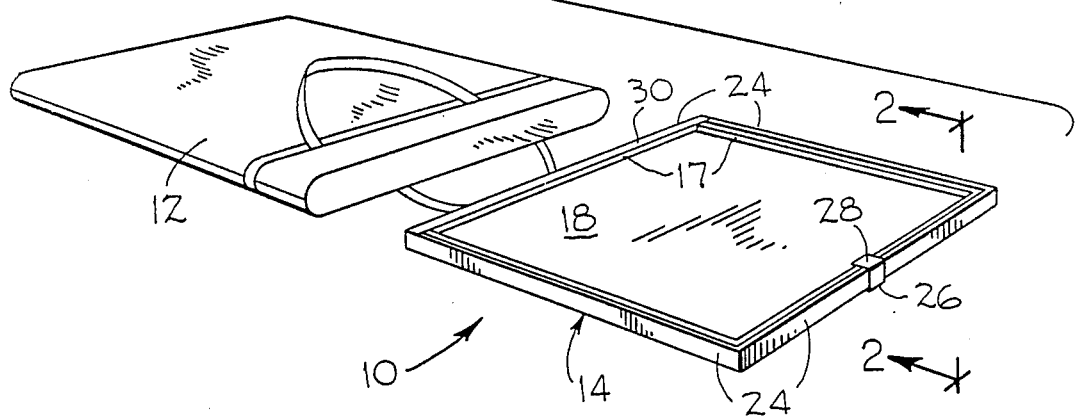
FIG. 1 is a diagrammatic, exploded, perspective view of a collapsed, portable cooking unit embodying the present invention illustrated with a carrying bag.
Figure 2:
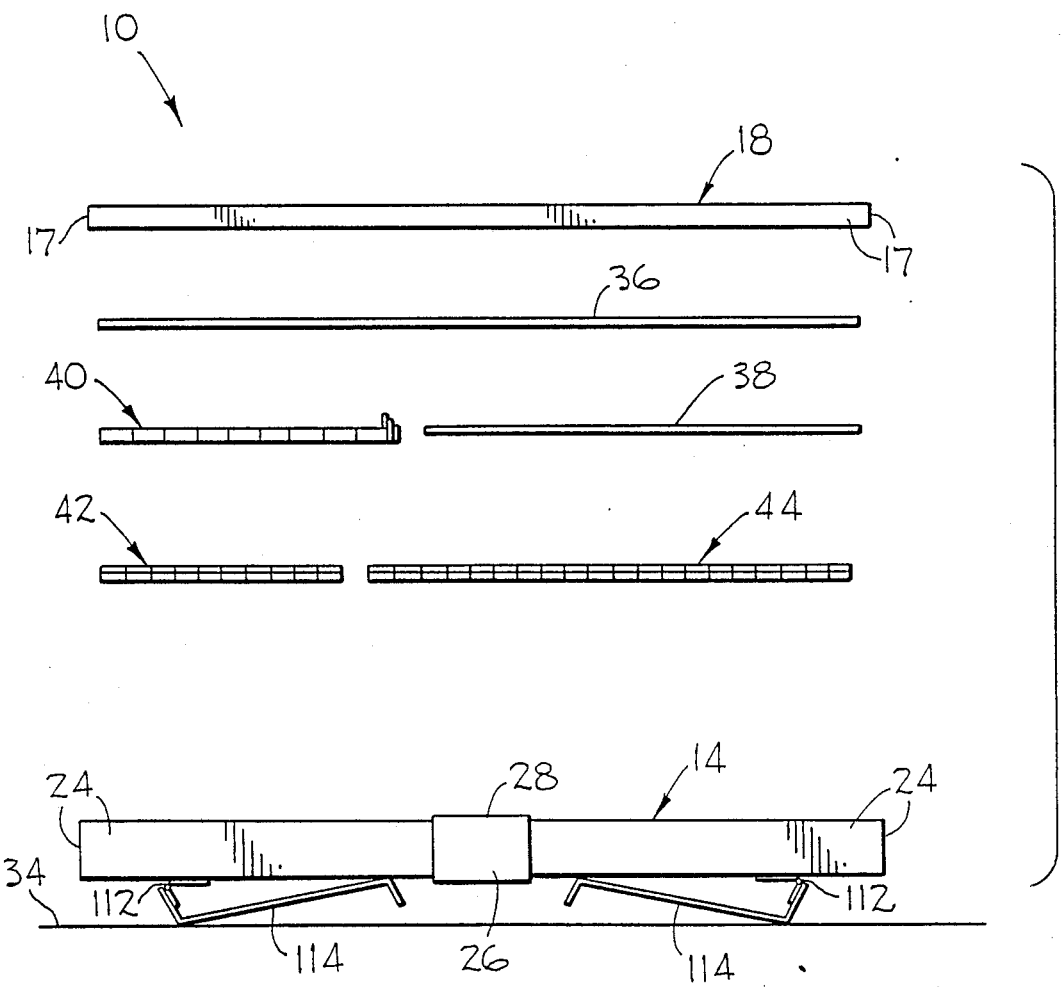
FIG. 2 is a diagrammatic, exploded, elevation view of the cooking unit illustrated in FIG. 1 taken along the line 2—2 of FIG. 1 showing a support, a folded support member, a folded firebox, a fire grate, a folded windbreak, a cooking grill, and a cover.

Illustrated in FIG. 1 is a collapsible cooking unit 10 which is adaptable to be carried in a cloth carrying bag 12, when in a collapsed state. The cooking unit 10 comprises a support or base 14 formed with upstanding flanges 24 along the perimeter thereof. The support or base 14 has a quadrilateral configuration. A cover 18 with a quadrilateral configuration has depending flanges 17 along the perimeter thereof. When the cooking unit 10 is in a collapsed, compact state, the support or base 14 and the cover 18 form a container for containing a folded support member or support collar 42, a folded firebox 44, a cooking grill 36, a fire grate 38 embodying the present invention and a folded windbreak 40 (FIG. 2). When the support or base 14 and the cover 18 form a container, the flanges 24 and 17 are directed toward one another (FIG. 1).

The support or base 14 is formed with the upstanding flanges 24. Secured to one side of the support or base 14 in the vicinity of the center of one of the flanges 24 is a U-shaped, yieldable latch 26 having an inturned free end 28 which projected across the upper edge of the flange 24. Projecting toward the free end 28 of the latch 26 along the edge of another flange 24, when the base 14 and the cover 18 are arranged to form a container, is a ledge 30 of the base 14. The ledge 30 extends over one edge of the cover 18. Thus, the cover 18 may be removed from the base 14 by displacing the free end 28 of the latch 26 outward away from the base 14. With the free end 28 drawn outward beyond the flange 24, the edge of the cover 18 immediately adjacent to the flange 24 may be raised upward from the base 14 above the flange 24 and then drawn outward from beneath the ledge 30 for removing the cover 18 from the base 14.

After the cover 18 has been removed from the base 14, the cooking grill 36, the fire grate 38 embodying the present invention, the folded windbreak 40, the folded support member 42, and the folded firebox 44 are successively removed from the fire base 14. The fire base 14, cover 18, cooking grill 36, fire grate 38, windbreak 40, support member 42 and firebox 44 are preferably fabricated from stainless steel sheet material. The stainless steel walls of the firebox 44 reflect the heat and direct the heat along the paths of travel.

The support member or support collar 42 (FIG. 3) comprises trapezoidally shaped panels 52a–52d joined together along juxtaposed, non-parallel edges thereof by suitable hinges 54. Each panel of a pair of opposing panels 52b and 52d of the support member or support collar 42 is formed from a pair of plates 56 joined together by a hinge 58 located intermediate the non-parallel edges thereof. The hinges 58 joining the plates 56 are located along the centerline of the opposing panels 52b and 52d orthogonal to the parallel edges thereof. The hinges 54 and 58 allow the opposing panels 52a and 52c to be disposed adjacent to each other with the folded opposing panels 52b and 52d therebetween when folded into a substantially flat configuration. When the support member 52 is folded into a substantially planar shape, the hinges 58 are disposed adjacent to each other between the opposing panels 52a and 52c. When the support member 42 is to be extended, the opposing panels 52a and 52c of the support member 42 are removed for displacement relative to one another in the opposing directions indicated by the arrows 60 and 62 (FIG. 3). Thereupon, panels 52a–52d of the support member 42 form a hollow, truncated pyramid which is open at both its larger and smaller ends.

The firebox 44 comprises trapezoidally shaped panels 72a–72d joined together along juxtaposed non-parallel edges thereof by suitable hinges 74. Each panel of a pair of opposing panels 72b and 72d of the firebox 44 is formed from a pair of plates 76 joined together by a hinge 78 located intermediate the non-parallel edges thereof. The hinges 78 joining the plates 76 are located along the centerline of the opposing panels 72b and 72d orthogonal to the parallel edges thereof. The hinges 74 and 78 allow the opposing panels 72a and 72c to be disposed adjacent to each other with the folded opposing panels 72b and 72d therebetween when folded into a substantially flat configuration. When the firebox 44 is folded into a substantially planar shape, the hinges 78 are disposed adjacent to each other between opposing panels 72a and 72c. When the firebox 44 is to be extended, the opposing panels 72a and 72c of the firebox 44 are moved for displacement relative to one another in the opposing directions indicated by the arrows 80 and 82 (FIG. 3). Thereupon, panels 72a–72d of the firebox 44 form an inverted, hollow, truncated pyramid which is open at both its larger and smaller ends.

The windbreak 40 comprises a plurality of rectangularly shaped panels 92a–92c joined together along juxtaposed, parallel edges thereof by suitable hinges 94. The hinges 94 allow the panels 92a–92c to be disposed adjacent to each other with the folded panel 92c sandwiched between the panels 92a and 92b to arrange the windbreak 40 into a substantially flat configuration. When the windbreak 40 is to be extended, the opposing panels 92a and 92c of the windbreak 40 are moved for displacement relative to the panel 92b in the directions indicated by the curved arrows 96 and 98 (FIG. 3). Thereupon, the panels 92a–92c form a U-shaped windbreak 40. To increase the rigidity of each of the panels 92a–92c and to provide a surface upon which they may rest, each of the panels 92a–92c is respectively formed with flanges 100 projecting orthogonally from one of the edges of the panels 92a–92c and aligned perpendicularly to the hinges 94. The windbreak 40 nests firmly and securely under the cooking grill 36 to provide a stable assembly and to provide a dependable support for the cover 18 when in the extended cooking mode as best shown in FIG. 6. As best illustrated in FIG. 2, the panels 92a–92c and the flanges 100 are formed so that the flanges 100 nest together when the panels 92a–92c are disposed adjacent to each other with the windbreak 40 arranged in the substantially flat configuration.

Referring now to FIGS. 4–6, to assemble and to extend the cooking unit 10 for cooking food, the base 14 is disposed above a supporting surface 34. Secured to the bottom wall of the base 14 across the full dimension thereof and aligned parallel to confronting flanges 24 are spaced apart elongated hinges 112 for respectively attaching a leg 114 to the base 14. Each leg 114 is formed with a "Z" cross sectional area and extends lengthwise along its associated hinge 112. In erecting the cooking unit 10, the legs 114 are extended downwardly about the axis of the hinges 112 beneath the base 14 as indicated by the curved arrows 118 and 120 (FIG. 5). In the extended configuration, outward rotation of the legs 114 about the axis of the hinge 112 is limited by engagement between the bottom of the base 14 and the upper edge of each leg 114. The upper edge of each leg 114 abuts the bottom of the base 14, which serves as a stop, for providing a stable, dependable leg support (FIGS. 4 and 6). The legs 114 in the extended state are disposed at a suitable angle downwardly and outwardly.

After the extended legs 114 of the base 14 have been disposed on the supporting surface 34, the support member or support collar 42 receives the smaller, lower end of the firebox 44 after the firebox 44 has been extended into an inverted, truncated pyramid. The panels 52a–52d of the support member 42 support the firebox 44 by engagement with the panels 72a–72d of the firebox 44 intermediate the upper and lower ends thereof. To provide mechanical stability when the firebox 44 is received into and supported by the support member 42, the smaller end of the firebox 44 extends downwardly a substantial distance into the support member 42 (FIG. 6).

With the firebox 44 thus supported by the support member 42 and with the inner, larger open end of the firebox 44 projecting upwardly above the support member 42, the firebox 44 is prepared to receive the fire grate 38 embodying the present invention and the cooking grill 36. In the exemplary embodiment, both the fire grate 38 and the cooking grill 36 are quadrilateral in configuration. The cooking grill 36 is slightly smaller in dimension than the size of the opening in the larger, upper end of the inverted, pyramidal firebox 44. The size of the fire grate 38 is smaller than the cooking grill 36 and larger than the smaller, lower end of the firebox 44. The fire grate 38 is disposed in the firebox 44 (FIG.

6) before the cooking grill 36 is disposed in the firebox 44. The fire grate 38 is supported intermediate the upper and lower ends of the firebox 44 through engagement with the panels 72a–72d of the firebox 44. When the cooking grill 36 is placed in the firebox 44 subsequent to the installation of the fire grate 38, the cooking grill 36 is supported above the fire grate 38 and adjacent to the larger, upper end of the firebox 44 through engagement with the panels 72a–72d of the firebox 44. When arranged in this manner, the cooking unit 10 may be used for cooking food on the grill 36.

When the cooking unit 10 is used for grill cooking, combustible material, such as briquettes or fuel elements B, are placed on the fire grate 38 in accordance with the present invention. The cooking grill 36 is fabricated from a perforated sheet metal stock to allow combustion air to flow through the cooking grill 36. The cooking grill 36 is illustrated in FIG. 5. In addition, a row of longitudinally displaced vent holes 122 (FIG. 5) are formed through each of the opposing panels 52a and 52c of the support member 42 intermediate the lower and upper edges of the support member 42. The vent holes 122 allow combustion air to enter the support member 42 to reach the combustion material on the fire grate 38. The pyramidal configuration of the support member 42 and the firebox 44 and the stainless steel construction of the support member 42 and the firebox 44 provide improved heat flow paths to enhance the concentration of heat at the cooking grill 36 and also provides greater space efficiency for the cooking unit 10.

Under circumstances of inclement weather, such as cold and/or winds, the concentration of heat at the cooking grill 36 may be further enhanced by extending the windbreak 40 and installing it under top of the cooking grill 36 with the flanges 100 of the panels 92a–92c disposed beneath the cooking grill 36 (FIGS. 5 and 6) and in engagement with the side panels of the firebox 44. A further increase in heat concentration at the cooking grill 36 may be obtained by disposing the cover 18 on top of the windbreak 40 to totally enclose the space above the cooking grill 36 except for the open side of the windbreak 40 facing the panel 92b. Alternatively, if foodstuffs, such as pancake batter, or foods which include small particles, such as ground meat, or vegetables, such as peas, are to be cooked, the cover 18 may be placed directly on the upper edges of the firebox 44, as illustrated in FIG. 7, to provide a solid, continuous cooking surface.

When the cooking unit 10 is no longer needed for cooking, it may be easily disassembled for storage within the carrying bag 12 by successively removing the cover 18 and the windbreak 40, if they are installed, followed by the cooking grill 36, the fire grate 38 embodying the present invention, the firebox 44, and the support member 42. Then, the legs 114 are folded up against the bottom wall of the base 14 and the base 14 is placed on the supporting surface 34 as illustrated in FIG. 2. The support member 42 and the firebox 44 are then successively folded as described previously in connection with FIG. 3 and are placed side-by-side on the base 14 within the perimetric flanges 24 thereof. Next, the windbreak 40 is folded as described previously in connection with FIG. 3. The windbreak 40 and the fire grate 38 are then placed side-by-side on the fire base 14 on top of the folded support member 42 and firebox 44 and within the perimetric flanges 24. The cooking grill 36 is then placed within the base 14 on top of the windbreak 40 and fire grate 38 followed by the cover 18.

To install the cover 18 on the base 14, one of its edges is inserted beneath the ledge 30 (FIG. 1) and the free end 28 of the latch 26 is drawn outward away from the fire base 14 beyond the flange 24. With the free end 28 of the latch 26 thus withdrawn, the edge of the cover 18 opposite to the ledge 30 is lowered onto the base 14 after which the free end 28 of the latch 26 is released to detachably secure the cover 18 to the base 14. Finally the container formed by the base 14 together with the cover 18 is inserted into the carrying bag 12. To restrain the legs 114 from rotating downward to the extended position beneath the base 14 while the base 14 and cover are inserted into the carrying bag 12, it is helpful to either grasp the base 14 with one or more fingers beneath the legs 114 thus holding them upward against the bottom wall of the firebox 44, or to invert the base 14 and the attached cover 18 so the legs 114 are held downward against the bottom wall of the fire base 14 by the force of gravity.

The cover 18 is employed to perform various functions. In one instance, it is the lid or the cover for a container when the cooking unit 10 is in a collapsed state for transporting and storage. In another instance, the cover 18 is the top of a cooking area above the cooking grill 36 (FIGS. 5 and 6). Thirdly, the cover 18 may be employed as a food warmer plate and installed between the legs 114 when the cooking unit 10 is extended for cooking food. In this event, the cover 18 is removed from the top of the firebox 44 (FIG. 7) and disposed between the legs 114.

By virtue of the truncated pyramidal configuration for the support member 42, the igniting of the briquettes or fuel elements B on the fire grate 38 is facilitated. The heat generated by the igniting of kindling material on the support 14 is conducted by virtue of the surface angle of the support member 42 over a path focusing or concentrating the heat on the fuel grate 38. The heat so generated is thereby made more intense on the fuel grate 38 while heat losses are reduced. The reflective surfaces of the stainless steel walls of the support member reduce heat absorption and, hence, more efficient use of the fuel igniting heat is realized.

Through the use of an inverted, truncated pyramidal configuration for the firebox 44, the cooking unit 10 of the present invention is more fuel efficient. The truncated, pyramidal configuration of the firebox 44 is able to reflect the source of heat efficiently to the cooking grill 36. The stainless steel reflective walls of the firebox 44 make this possible. Black surfaces absorb heat rather than reflect the heat. In addition to the foregoing, the present invention provides a foldable cooking unit that is compact to facilitate the transportation and storage thereof.

An abandoned U.S. application filed by the inventor of the present application on Dec. 14, 1984, Ser. No. 06/681,803, for Collapsible Portable Outdoor Stove With Legs, discloses the foregoing with the exception of the improved fire grate 38 which embodies the present invention and with the exception of the disposition of briquettes or fuel elements B on the improved fire grate 38. The assignee of the present application is the assignee of the aforementioned abandoned application.

The improved fire grate 38 of the present invention (FIGS. 8 and 9), in the preferred embodiment, is formed with parallel, diagonal slots 150. The slots 150 are configured to receive the narrow edge or narrow width section of a briquette or fuel element B (FIG. 9). The narrow edge or narrow width section of the briquette or fuel element B is the end section E or the side section S thereof. Thus, the narrow dimensioned section of the briquette B extends upwardly or is vertically oriented. The walls surrounding the slots 150 support the briquettes B for vertical or upstanding orientation. In contradistinction, the wide sections of the commonly shaped briquette B are the relatively flat bottom section U or the relatively flat top section T. In the present invention, the insertion of the narrow edge or narrow width section of the briquette B into the slot 150 results in the flat wide bottom section U and the flat wide top section T of the briquette B extending upwardly in vertical orientation rather than the narrow edges (or narrow width sections) and the flat wide bottom and top sections being oriented horizontally in the slot 150. The openings 151 and 152 of the fire grate 38 are for the free flow of combustion air through the fire grate 38 for improved combustion. The combustion openings 151 are disposed adjacent the quadrilateral edges of the fire grate 38 and the combustion openings 152 are disposed adjacent to the walls defining the slots 150.

By placing the briquettes B in a spaced relation in the slots 150 with the end section E of the briquettes B received by the slots 150 or with the side sections S of the briquettes B received by the slots 150, ash formations on the briquettes B fall off over a greater exposed area of the briquettes B. Additionally, a greater area of the briquettes B is exposed to combustion air. As a consequence thereof, the briquettes B heat to a higher optimum temperature more expeditiously than if the flat wide bottom sections U of the briquettes B were received by the slots 150 in a horizontal orientation and/or the briquettes B were placed in the slots 150 in a random manner. With effective air flow through the openings 151 and 152 for the combustion of the briquettes B and with the reflective inner surfaces of the walls of the firebox 44, there is a greater heat concentration directed or focused on the cooking grill 36 of the cooking unit 10.

While the fire grate 38 is illustrated as a plate with slots 150 formed therein, it is to be understood that the fire grate 38 may be any suitable member that supports fuel elements so that the edges or narrow sections thereof are disposed upwardly or are vertically oriented. Additionally, the fuel elements may be spaced apart for the free flow of combustion air therebetween. While reference herein is made to a briquette, it is apparent that other fuel elements may be employed to carry out the present invention and fall within the purview of the present invention.

Optionally disposed within the firebox 44 is a foil liner bag 155 (FIG. 12). In the exemplary embodiment, the foil liner bag 155 is made of aluminum foil. The foil liner bag 155 is disposed in engagement with the inner wall surfaces of the firebox 44. The edges around the opening of the foil liner bag 155 are crimped over the top of the walls surrounding the opening of the firebox 44. The fuel grate 38 is disposed over the bottom wall of the fuel liner bag 155. As the briquettes B burn, the ashes falling therefrom pass through the slots 150 and the openings 152 of the fire grate 38 to collect in the foil liner bag 155. As the briquettes B burn to a width dimension smaller than the width of the slots 150, such briquettes will drop into the foil liner bag 155 through the slots 150. After the ashes fall into the foil liner bag 155 and after the current use of the cooking unit is completed, the foil liner bag 155 is removed from the firebox 44 and is discarded safely.

Illustrated in FIG. 10 is a fire grate 160 which is a modification of the fire grate 38 shown in FIG. 8. The fire grate 160 comprises a top plate 161 for supporting briquettes or fuel elements B. Formed in the top plate 161 are slots 162 having generally oval configurations to receive an end section E or a side section S of the briquettes B, while the briquettes B are supported by the top plate 161 for upstanding, vertical orientation. The slots 162 are arranged in parallel rows and columns. Formed in the top plate 161 are openings 163 for the free flow of combustion air through the fire grate 160. The slots 152 are configured to receive the narrow width section of the briquette or fuel element B in order to support the briquette or fuel element B in an upstanding, vertical orientation. The narrow width section of the briquette B is the end section E or the side section S thereof.

In the exemplary embodiment, the fire grate 160 is made of stainless steel and includes depending side walls 170-172. The side walls 170-172 extend from the outer edges of the top plate 161. The fire grate 160, in the exemplary embodiment, as a rectangular-shaped unit, seats on the inner walls of a firebox 175 (FIG. 11).

Illustrated in FIG. 11 is a cooking unit 180 which comprises the firebox 175. The firebox 175 is similar in function to the firebox 44 shown in FIGS. 1-7. The firebox 175, however, includes an air control lever 181 that is connected to a circular damper 182 disposed in an opening 183 formed in the bottom wall of the firebox 175. By actuating the handle 181, the damper 182 is actuated to control the flow of air through the opening 183. The firebox 175 is supported by suitable support legs 185. The handle 181 is fixed to the damper 182 to move the damper 182 over a rectilinear path. The damper 182 is guided and supported by spaced channel members 182a and 182b for movement over the rectilinear path.

Seated within the firebox 175 is the fire grate 160 embodying the present invention. Supported by the firebox 175 is support member 186. A cooking grill 187 seats on the support member 186. A hood 188 seats on the cooking grill 187. Insulated handles 190 are fixed to the hood 188 and project outwardly therefrom. The support member 186 is similar in construction and function to the support member 42 (FIGS. 1-7) with the exception that the support member 186 seats within the firebox 175. The cooking grill 187 is similar in construction and function to the grill 36 shown in FIGS. 1-7. The hood 188 is similar to the hood 40 (FIGS. 1-7) in construction and function with the exception that the hood 188 includes insulated handles 190.

What is claimed is:

1. A fire grate for cooking unit using a briquette having a narrow edge and a vertical orientation comprising a planar member having an enclosed opening surrounded by an endless wall formed to receive said narrow edge of the briquette and to support said briquette in vertical orientation, said member comprising at least one opening for exposing the briquette to combustion air or gas.

2. A fire grate as claimed in claim 1 wherein said member is adapted to support a plurality of said briquettes in spaced relationship for combustion air or gas to flow therebetween.

3. A fire grate for cooking unit using a fuel element with a narrower dimensioned section comprising a planar member having an enclosed opening surrounded by an endless wall configured to receive and to support a fuel element with the narrower dimensioned section of the fuel element extending upwardly in a generally vertical direction, said member being formed with at least one opening for exposing the fuel element to combustion air or gas.

4. A fire grate as claimed in claim 3 wherein said member is adapted to support a plurality of said fuel elements in spaced relationship for combustion air or gas to flow therebetween.

5. A fire grate for cooking unit using a briquette with a vertical orientation comprising a planar member having an enclosed opening surrounded by an endless wall for receiving and supporting the briquette in vertical orientation, said member comprising at least one opening for exposing the briquette to combustion air or gas.

6. A fire grate as claimed in claim 5 wherein said member is adapted to support a plurality of said briquettes in vertical orientation and in spaced relationship for combustion air or gas to flow therebetween.

* * * * *